United States Patent
Park et al.

(10) Patent No.: US 9,146,647 B2
(45) Date of Patent: Sep. 29, 2015

(54) TOUCH PANEL

(71) Applicant: SAMSUNG ELECTRO-MECHANICS CO., LTD., Suwon-Si, Gyeonggi-Do (KR)

(72) Inventors: Doo Ho Park, Suwon-Si (KR); Jang Ho Park, Suwon-Si (KR); Jung Ryoul Yim, Suwon-Si (KR); In Hyun Jang, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 23 days.

(21) Appl. No.: 14/227,741

(22) Filed: Mar. 27, 2014

(65) Prior Publication Data

US 2015/0199043 A1 Jul. 16, 2015

(30) Foreign Application Priority Data

Jan. 14, 2014 (KR) .......................... 10-2014-0004496

(51) Int. Cl.
*G06F 3/044* (2006.01)

(52) U.S. Cl.
CPC ...... *G06F 3/044* (2013.01); *G06F 2203/04112* (2013.01)

(58) Field of Classification Search
CPC ...................................................... G06F 3/045
See application file for complete search history.

(56) References Cited

U.S. PATENT DOCUMENTS

| 2001/0007274 A1* | 7/2001 | Sanada et al. .................. 156/329 |
| 2007/0046642 A1* | 3/2007 | Lee et al. ...................... 345/173 |
| 2012/0295071 A1 | 11/2012 | Sato et al. |
| 2013/0153390 A1 | 6/2013 | Lee et al. |

FOREIGN PATENT DOCUMENTS

| KR | 10-2013-0051316 A | 5/2013 |
| KR | 10-2013-0070165 A | 6/2013 |

* cited by examiner

*Primary Examiner* — Gerald Johnson
(74) *Attorney, Agent, or Firm* — NSIP Law

(57) ABSTRACT

A touch panel may include: a substrate having an upper surface and a lower surface; a first electrode layer disposed on the lower surface of the substrate and formed in a mesh shape; a first insulating layer disposed on the lower surface of the substrate and disposed to surround the first electrode layer; a surface reforming layer disposed on a lower surface of the first insulating layer and capable of reforming a hydrophobic surface to a hydrophilic surface; and a second electrode layer disposed on a lower surface of the surface reforming layer and formed in a mesh shape.

11 Claims, 3 Drawing Sheets

TOUCH PANEL

CROSS-REFERENCE TO RELATED APPLICATION

This application claims the benefit of Korean Patent Application No. 10-2014-0004496 filed on Jan. 14, 2014, with the Korean Intellectual Property Office, the disclosure of which is incorporated herein by reference.

BACKGROUND

The present disclosure relates to a touch panel.

A touch sensing apparatus such as a touch screen, a touch pad, or the like, which is an input apparatus attached to a display apparatus to provide an intuitive input method to a user, has recently been widely used in various electronic devices such as a cellular phone, a personal digital assistant (PDA), a navigation device, and the like. Particularly, as demand for a smart phone has increased, a touch screen capable of providing various input methods within a limited form factor has been increasingly used.

The touch screen used in a portable device may mainly be divided into a resistive type touch screen and a capacitive type touch screen according to a method of sensing a touch input. Here, the capacitive type touch screen has advantages in that it has a relatively long lifespan and that it may easily implement various input methods and gestures, such that the use thereof has been increasing. Particularly, since the capacitive type touch screen may implement a multi-touch interface more easily as compared with the resistive type touch screen, it is widely used for devices such as a smart phone and the like.

The capacitive type touch screen includes a plurality of electrodes having a predetermined pattern and defining a plurality of nodes at which a capacitance change is generated by a touch input. At the plurality of nodes distributed on a two-dimensional plane, a self-capacitance or mutual-capacitance change is generated by the touch input. A coordinate of the touch input may be calculated by applying a weighted average method, or the like, to the capacitance change generated at the plurality of nodes.

In a touch panel according to the related art, a sensing electrode that recognizes touch is generally formed of indium tin oxide (ITO). However, the ITO is expensive and has low price competitiveness, because indium, used as a raw material thereof, is a rare earth metal. In addition, indium is expected to be depleted within the next decade, such that it may not be sufficiently supplied.

Thus, research into technology of forming the electrode using non-transparent conductive fine lines for reasons mentioned above has been conducted. Here, the electrode formed by the conductive fine lines such as a metal may have better conductivity than that of the ITO or conductive polymer and may be sufficiently supplied.

In order to implement the touch panel as described above, a multi-layer structure should be implemented.

Particularly, the touch panel using the conductive fine lines has a structure in which a metal electrode is mainly formed on an insulating material.

In order to implement the touch panel when the metal electrode is formed on the insulating material, adhesion between the metal electrode and the insulating material should be secured.

SUMMARY

An aspect of the present disclosure may provide a touch panel having improved adhesion between an insulating layer and an electrode layer.

According to an aspect of the present disclosure, a touch panel may include: a substrate having an upper surface and a lower surface; a first electrode layer disposed on the lower surface of the substrate and formed in a mesh shape; a first insulating layer disposed on the lower surface of the substrate and disposed to surround the first electrode layer; a surface reforming layer disposed on a lower surface of the first insulating layer and capable of reforming a hydrophobic surface to a hydrophilic surface; and a second electrode layer disposed on a lower surface of the surface reforming layer and formed in a mesh shape.

The touch panel may further include a surface reforming layer interposed between the substrate and the first electrode layer.

The surface reforming layer may include at least one silane layer.

The silane layer may be at least one of $SiO_2$, organic silane, or inorganic silane.

Some of functional groups of the organic silane may be substituted with at least one selected from a group consisting of amine, epoxy, hydride, sulfur, phosphorus, and carboxylate.

The first electrode layer or the second electrode layer may contain at least one selected from a group consisting of copper, gold, iron, tin, titanium, and zinc.

According to another aspect of the present disclosure, a touch panel may include: a substrate having an upper surface and a lower surface; a first surface reforming layer disposed on the upper surface of the substrate and capable of reforming a hydrophobic surface to a hydrophilic surface; a second surface reforming layer disposed on the lower surface of the substrate and capable of reforming a hydrophobic surface to a hydrophilic surface; a first electrode layer disposed on an upper surface of the first surface reforming layer and formed in a mesh shape; and a second electrode layer disposed on a lower surface of the second surface reforming layer and formed in a mesh shape.

The first surface reforming layer or the second surface reforming layer may include at least one silane layer.

The silane layer may be at least one of $SiO_2$, organic silane, or inorganic silane.

Some of functional groups of the organic silane may be substituted with at least one selected from a group consisting of amine, epoxy, hydride, sulfur, phosphorus, and carboxylate.

The first electrode layer or the second electrode layer may contain at least one selected from a group consisting of copper, gold, iron, tin, titanium, and zinc.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
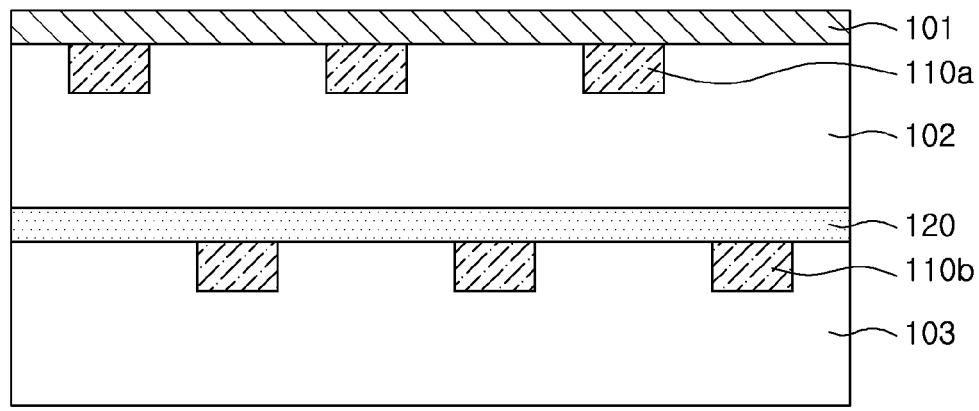
FIG. 1 illustrates a schematic cross-sectional view of a touch panel according to an exemplary embodiment of the present disclosure.

Exemplary embodiments of the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

FIG. 1 illustrates a schematic cross-sectional view of a touch panel 100 according to an exemplary embodiment of the present disclosure.

Referring to FIG. 1, the touch panel according to an exemplary embodiment of the present disclosure may include a substrate 101, insulating layers 102 and 103, first and second electrode layers 110a and 110b, and a surface reforming layer 120.

In a case of a mobile device, the touch panel may generally be provided to be integrated with a display apparatus and need to have a high enough light transmissivity to transmit a screen displayed by the display apparatus.

Therefore, the substrate 101 may be formed using a film such as polyethylene terephtalate (PET), polycarbonate (PC), polyethersulfone (PES), polyimide (PI), polymethylmethacrylate (PMMA), cyclo-olefin polymers (COP), or the like, and a transparent material such as a soda glass or a tempered glass, or the like.

The substrate 101 may have an upper surface and a lower surface, where one surface becomes a direction viewed by a user, and a sensor is formed in an opposite direction.

For example, the upper surface of the substrate may become the surface viewed by the user.

The first electrode layer 110a may be formed on the lower surface of the substrate 101.

The first electrode layer 110a may be formed to have a mesh shape using conductive fine lines.

The first electrode layer 110a may be formed of any one metal of Ag, Al, Cr, Ni, Mo, and Cu, or an alloy thereof, and may be formed in a single layer or a multi-layer.

In general, the conductive fine line may have a line width of 0.5 μm to 10 μm.

When the line width is narrower than 0.5 μm a defective rate and a resistance value may be increased due to broken lines, and when the line width is wider than 10 μm, transmissivity may be decreased.

The first electrode layer 110a may be formed using a vacuum deposition process such as a sputtering process, an E-beam process, or the like, an electrolytic process such as a plating process, and processes such as a printing process, an imprinting process, and the like.

A first insulating layer 102 may be formed on the lower surface of the substrate 110 to surround the first electrode layer 110a.

The first insulating layer 102 may be formed using an optically clear adhesive film, but is not limited thereto.

A second electrode layer 110b may be formed on the lower surface of the first insulating layer 102, and a second insulating layer 103 may be formed on the lower surface of the first insulating layer 102 to surround the second electrode layer 110b.

The second electrode layer 110b may be formed to have a mesh shape using the conductive fine lines.

The second electrode layer 110b may be formed of any one metal of Ag, Al, Cr, Ni, Mo, and Cu, or an alloy thereof, and may be formed in a single layer or a multi-layer.

In general, the conductive fine line may have a line width of 0.5 μm to 10 μm.

When the line width is narrower than 0.5 μm, a defective rate and a resistance value may be increased due to broken lines, and when the line width is wider than 10 μm, transmissivity may be decreased.

The second electrode layer 110b may be formed using a vacuum deposition process such as a sputtering process, an E-beam process, or the like, an electrolytic process such as a plating process, and processes such as a printing process, an imprinting process, and the like.

A second insulating layer 103 may be further formed on the lower surface of the first insulating layer 102 to surround the second electrode layer 110b.

The touch panel 100 according to an exemplary embodiment of the present disclosure is operated by electrically connecting the first and second electrode layers 110a and 110b and a controller integrated circuit to each other to thereby sense a touch input.

The controller integrated circuit detects a change in capacitance generated by the touch input from the first and second electrode layers 110a and 110b and senses the touch input from the detected change in capacitance.

Therefore, in order to increase the change in capacitance, the first insulating layer 102 and the second insulating layer 103 may be formed using a material having high dielectric constant.

The first insulating layer 102 and the second insulating layer 103 may be formed of an inorganic or organic insulating material containing one of Al2O3, Ta2O5, Nb2O5, and TiO2. In this case, the first and second insulating layers 102 and 103 may be manufactured to have a thickness of 1 μm to 10 μm.

In general, the organic insulating material used as the first insulating layer 102 may have degraded adhesion with an electrode formed of a metal material.

Particularly, when the electrode is formed using the conductive fine lines of the mesh shape, an area in which the second electrode layer 110b is adhered to the first insulating layer 102 may be relatively very small.

Thereby, in the case in which adhesion with the electrode is degraded, the lines may break. Therefore, there is a need to improve adhesion between the first insulating layer 102 and the second electrode layer 110b.

Therefore, a surface reforming layer 120 may be formed between the first insulating layer 102 and the second electrode layer 110b.

The surface reforming layer 120 may reform a surface of the first insulating layer 101 from being hydrophobic to being hydrophilic.

The surface reforming layer 120 may be formed to include a silane layer.

The silane layer may be $SiO_2$, organic silane, or inorganic silane.

A role of the surface reforming layer 120 will be described with reference to FIGS. 2 and 3.

Figure 2:
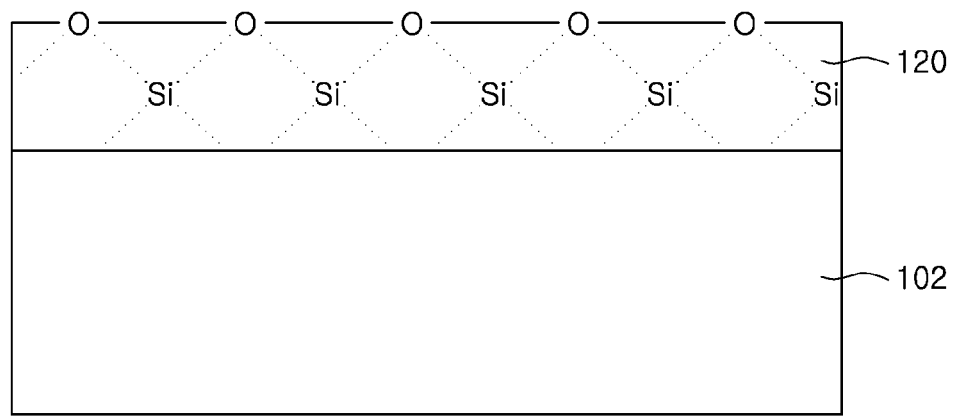
FIG. 2 illustrates a schematic cross-sectional view of a touch panel in the case in which a surface reforming layer contains $SiO_2$.

FIG. 2 illustrates a schematic cross-sectional view of a touch panel in the case in which a surface reforming layer 120 contains $SiO_2$.

Referring to FIG. 2, it may be seen that the surface reforming layer 120 is formed on the first insulating layer 102.

$SiO_2$ has excellent adhesion with a general organic insulating material as compared to a metal, and also has excellent adhesion with the metal.

In the case in which the surface reforming layer 120 contains $SiO_2$, $SiO_2$ may change properties of a surface of the insulating layer 102, whereby adhesion between the insulating layer 102 and the second electrode layer 110b may be improved.

Figure 3:
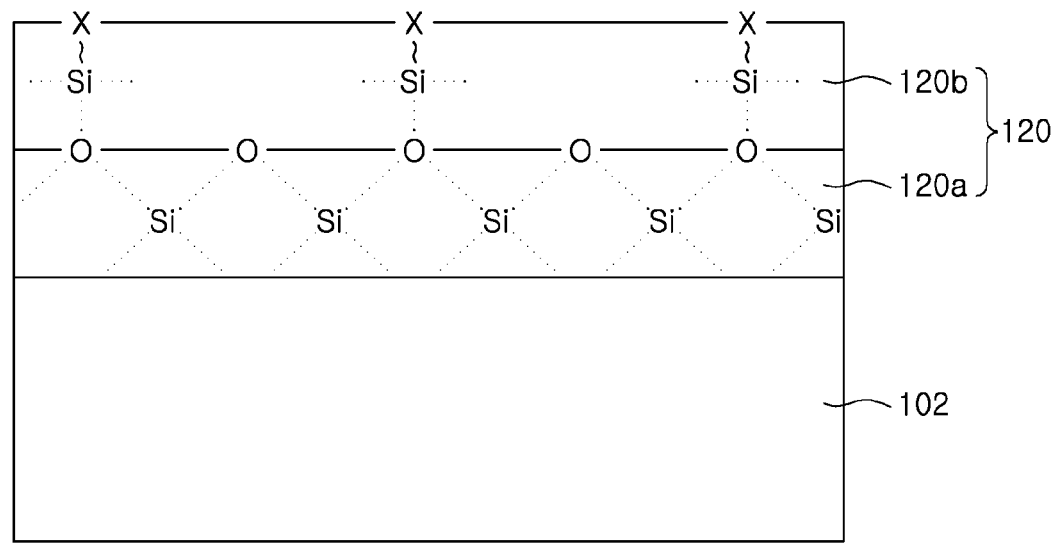
FIG. 3 illustrates a schematic cross-sectional view of a touch panel in the case in which a surface reforming layer contains organic silane.

FIG. 3 illustrates a schematic cross-sectional view of a touch panel in the case in which a surface reforming layer contains organic silane.

In order to further improve adhesion between the first insulating layer 102 and the second electrode layer 110b, the surface reforming layer 120 may contain organic silane.

When the surface reforming layer 120 contains organic silane as illustrated in FIG. 3, adhesion with the metal may be improved by substituting a functional group X.

Some of the functional group of organic silane may be substituted with at least one selected from the group consisting of amine, epoxy, hydride, sulfur, phosphorus, and carboxylate.

The following Table 1 describes the functional groups capable of improving adhesion according to a material of the second electrode layer 110b.

TABLE 1

| Metal | Functional Group (X) |
|---|---|
| Copper | Amine |
| Gold | Sulfur |
| | Phosphorus |
| Iron | Amine |
| | Sulfur |
| Tin | Amine |
| Titanium | Epoxy |
| | Hydride |
| Zinc | Amine |
| | Carboxylate |

As shown in Table 1 described above according to the materials of the second electrode layer 110b, in order to improve adhesion between the first insulating layer 102 and the second electrode layer 110b, the functional group X of the organic silane of the surface reforming layer 120 may be appropriately substituted.

Examples of silane contained in the surface reforming layer 120 may include inorganic based oxide.

For example, tetra-alkoxy silanes such as tetramethoxysilane, tetraethoxysilane, tetra-n-propoxysilane, tetra-i-propoxysilane, tetra-n-butoxy silane, and the like, which are silicon oxides; trialkoxysilanes such as methyltrimethoxysilane, methyltriethoxysilane, ethyltrimethoxysilane, ethyl triethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-pentyltriethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, N-(2-aminoethyl)-3-aminopropyltrimethoxysilane, N-(2-aminoethyl)-3-aminopropyltriethoxysilane, 3-chloropropyltrimethoxysilane, 3-chloropropyltriethoxysilane, 3,3,3-trichloropropyltrimethoxysilane, 3,3,3-trichloropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatepropyltrimethoxysilane, 3-isocyanatepropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureidopropyltrimethoxysilane, 3-ureidopropyltriethoxysilane, vinyltrimethoxysilane, vinyltriethoxysilane, allyltrimethoxysilane, vinyltriacetoxysilane, and the like; a sol-gel coating film formed by hydrolysis polymerization from alcohol of organoalkoxysilanes such as methyltriacetyloxysilane, methyltriphenoxysilane, and the like, water, acid, and the like; and a sputtering deposition film of silicon oxide, and the like, may be used.

Figure 4:
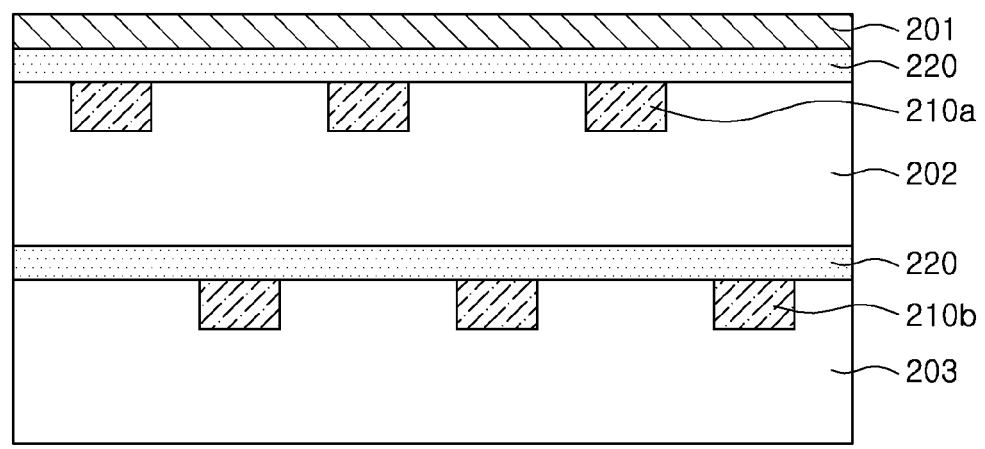
FIG. 4 illustrates a schematic cross-sectional view of a touch panel according to another exemplary embodiment of the present disclosure.

FIG. 4 illustrates a schematic cross-sectional view of a touch panel 200 according to another exemplary embodiment of the present disclosure.

In FIG. 4, descriptions of the components described in FIG. 1 will be omitted.

Referring to FIG. 4, a surface reforming layer 220 may further be formed between a substrate 201 and a first electrode layer 210a.

As described above, the substrate 201 may be formed using a film such as polyethylene terephtalate (PET), polycarbonate (PC), polyethersulfone (PES), polyimide (PI), polymethylmethacrylate (PMMA), cyclo-olefin polymers (COP), or the like, and a transparent material such as a soda glass or a tempered glass, or the like.

When the substrate 201 is formed using a polymer film such as polyethylene terephtalate (PET), polycarbonate (PC), polyethersulfone (PES), polyimide (PI), polymethylmethacrylate (PMMA), cyclo-olefin polymers (COP), or the like, adhesion between the substrate 201 and the first electrode layer 210a may be decreased.

Therefore, adhesion between the substrate 210 and the first electrode layer 210a may be improved by forming the surface reforming layer 220 between the substrate 201 and the first electrode layer 210a.

Figure 5:
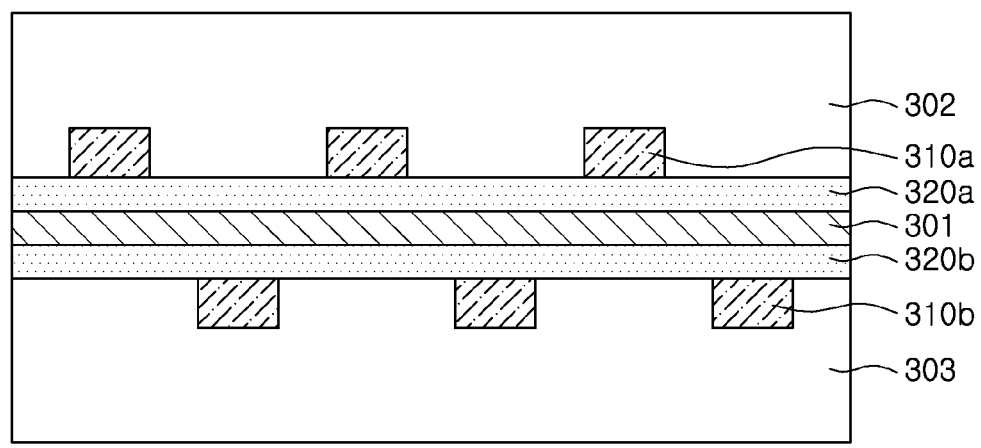
FIG. 5 illustrates a schematic cross-sectional view of a touch panel according to another exemplary embodiment of the present disclosure.

FIG. 5 illustrates a schematic cross-sectional view of a touch panel 300 according to another exemplary embodiment of the present disclosure.

Referring to FIG. 5, the touch panel 300 according to another exemplary embodiment of the present disclosure may include a substrate 301 having an upper surface and a lower surface, a first surface reforming layer 320a formed on the upper surface of the substrate 301 and capable of reforming a hydrophobic surface to a hydrophilic surface, a second surface reforming layer 320b formed on the lower surface of the substrate 301 and capable of reforming a hydrophobic surface to a hydrophilic surface, a first electrode layer 310a formed on an upper surface of the first surface reforming layer 320a and formed in a mesh shape, and a second electrode layer 310b formed on a lower surface of the second surface reforming layer 320b and formed in a mesh shape.

The substrate 301 may be formed using a polymer film such as polyethylene terephtalate (PET), polycarbonate (PC), polyethersulfone (PES), polyimide (PI), polymethylmethacrylate (PMMA), cyclo-olefin polymers (COP), or the like.

When the substrate 301 is formed using a polymer film such as polyethylene terephtalate (PET), polycarbonate (PC), polyethersulfone (PES), polyimide (PI), polymethylmethacrylate (PMMA), cyclo-olefin polymers (COP), or the like, adhesion between the substrate 301 and the first and second electrode layers 310a and 310b may be decreased.

Therefore, adhesion between the substrate 301 and the first and second electrode layers 310a and 310b may be improved by forming the surface reforming layer 320 between the substrate 301 and the first and second electrode layers 310a and 310b.

As set forth above, according to exemplary embodiments of the present disclosure, the touch panel may improve adhesion between the insulating layer and the electrode layer by disposing the surface reforming layer between the insulating layer and the electrode layer.

While exemplary embodiments have been shown and described above, it will be apparent to those skilled in the art that modifications and variations could be made without departing from the spirit and scope of the present disclosure as defined by the appended claims.

What is claimed is:

1. A touch panel, comprising:
   a substrate having an upper surface and a lower surface;
   a first electrode layer disposed on the lower surface of the substrate and formed in a mesh shape;
   a first insulating layer disposed on the lower surface of the substrate and disposed to surround the first electrode layer;
   a surface reforming layer disposed on a lower surface of the first insulating layer and capable of reforming a hydrophobic surface to a hydrophilic surface; and
   a second electrode layer disposed on a lower surface of the surface reforming layer and formed in a mesh shape.

2. The touch panel of claim 1, further comprising a surface reforming layer interposed between the substrate and the first electrode layer.

3. The touch panel of claim 1, wherein the surface reforming layer includes at least one silane layer.

4. The touch panel of claim 3, wherein the silane layer is at least one of $SiO_2$, organic silane, or inorganic silane.

5. The touch panel of claim 4, wherein some of functional groups of the organic silane is substituted with at least one selected from a group consisting of amine, epoxy, hydride, sulfur, phosphorus, and carboxylate.

6. The touch panel of claim 1, wherein the first electrode layer or the second electrode layer contains at least one selected from a group consisting of copper, gold, iron, tin, titanium, and zinc.

7. A touch panel, comprising:
   a substrate having an upper surface and a lower surface;
   a first surface reforming layer disposed on the upper surface of the substrate and capable of reforming a hydrophobic surface to a hydrophilic surface;
   a second surface reforming layer disposed on the lower surface of the substrate and capable of reforming a hydrophobic surface to a hydrophilic surface;
   a first electrode layer disposed on an upper surface of the first surface reforming layer and formed in a mesh shape; and
   a second electrode layer disposed on a lower surface of the second surface reforming layer and formed in a mesh shape.

8. The touch panel of claim 7, wherein the first surface reforming layer or the second surface reforming layer includes at least one silane layer.

9. The touch panel of claim 8, wherein the silane layer is at least one of $SiO_2$, organic silane, or inorganic silane.

10. The touch panel of claim 9, wherein some of functional groups of the organic silane is substituted with at least one selected from a group consisting of amine, epoxy, hydride, sulfur, phosphorus, and carboxylate.

11. The touch panel of claim 7, wherein the first electrode layer or the second electrode layer contains at least one selected from a group consisting of copper, gold, iron, tin, titanium, and zinc.

* * * * *